United States Patent [19]

Suzuki et al.

[11] Patent Number: 4,677,959
[45] Date of Patent: Jul. 7, 1987

[54] AIR INTAKE SIDE SECONDARY AIR SUPPLY SYSTEM FOR AN INTERNAL COMBUSTION ENGINE

[75] Inventors: Norio Suzuki, Tokyo; Akira Watabe, Fujimi; Kazunari Yamashita, Kamifukuoka, all of Japan

[73] Assignee: Honda Giken Kogyo Kabushiki Kaisha, Tokyo, Japan

[21] Appl. No.: 865,394

[22] Filed: May 21, 1986

[30] Foreign Application Priority Data

May 21, 1985 [JP] Japan ................... 60-109034

[51] Int. Cl.⁴ .......................................... F02M 23/08
[52] U.S. Cl. .................................... 123/587; 123/589
[58] Field of Search ............................. 123/585–589

[56] References Cited

U.S. PATENT DOCUMENTS 4,557,242 12/1985 Hasegawa ..................... 123/589
4,558,682 12/1985 Hasegawa et al. ............. 123/589
4,561,394 12/1985 Kishida et al. ................. 123/588

Primary Examiner—William A. Cuchlinski, Jr.
Attorney, Agent, or Firm—Birch, Stewart, Kolasch & Birch

[57] ABSTRACT

Air intake side secondary air supply system for an internal combustion engine includes first and second secondary air supply passages leading to an intake manifold in which an open/close valve and an air control valve are respectively provided for a proportional control and an integral control of secondary air. In order to improve a driveability of the engine during a transition period from a feedback control mode to an open loop control mode, pressure control device for controlling a supply of first and second control pressures respectively for opening and closing the air control valve is constructed to rapidly supply the second control pressure when a state of engine operation in which the feedback control mode is to be stopped is detected.

5 Claims, 2 Drawing Figures

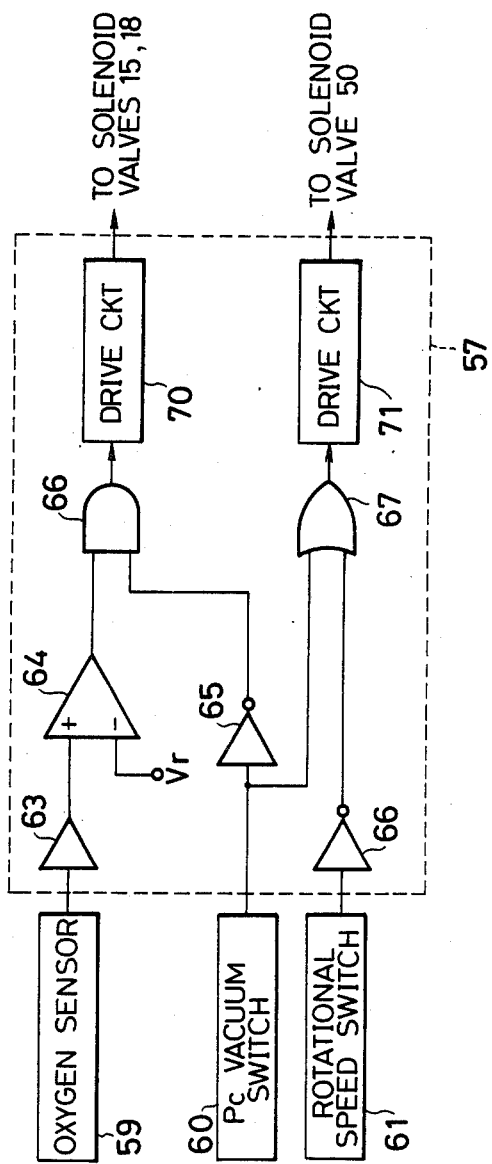

AIR INTAKE SIDE SECONDARY AIR SUPPLY SYSTEM FOR AN INTERNAL COMBUSTION ENGINE

BACKGROUND OF THE INVENTION

1. Field of the Invention

The present invention relates to an air intake side secondary air supply system for an internal combustion engine.

2. Description of Background Information

In internal combustion engines provided with a three-way catalytic converter in the exhaust system for the purificaiton of exhaust gas, a feedback control is generally executed for controlling the air/fuel ratio in accordance with the composition of exhaust gas and the operating conditions of the engine. This is because an optimum operation of the three-way catalytic converter is attained when the air/fuel ratio of mixture is around a stoichiometric value (14.7:1 for example). An air intake side secondary air supply system for feedback control is an example of the system having air/fuel ratio control operation of this type, in which a secondary air passage leading to a portion of an intake air passage downstream of the throttle valve is provided and the amount of a secondary air flowing therethrough is controlled for performing the air/fuel ratio control.

An air intake side secondary air supply system of this type is disclosed in Japanese patent application laid open No. 59-90753. In this system, an air control valve whose opening degree varies depending on a magnitude of pressure within its pressure chamber is provided in the secondary air supply passage leading to the portion of the intake manifold downstream of the throttle valve. An air/fuel ratio of the mixture supplied to the engine is detected from a concentration of a component of the exhaust gas, to produce an air/fuel ratio signal indicating a result of the detection of air/fuel ratio. In accordance with the air/fuel ratio signal, an integral control of air/fuel ratio is performed by supplying either one of a first control pressure for gradually opening the air control valve to increase a sectional area of the flow through the valve and a second control pressure for gradually closing the air control valve to decrease the sectional area, into the pressure chamber.

In such an air intake side secondary air supply system, the first and second control pressures are in turn supplied to the pressure chamber of the air control valve in response to a state of the air/fuel ratio signal, through a three-way solenoid valve having a switching operation for example, and a pressure supply passage. For performing the integral control operation, the first and second control pressures are supplied to the three-way valve through an orifice provided in the pressure supply passage. Also, if a surge tank is provided in the above mentioned pressure supply passage for suppressing the pulsation of the pressure, the capacity of the surge tank has an influence upon a time constant of the integration operation. The speed of increase or decrease of the opening degree of the air control valve is maintained constant while it is depending on the diameter of the orifice and the capacity of the surge tank. In this way, the air/fuel ratio of the mixture supplied to the engine increases or decreases gradually towards the stoichiometric air/fuel ratio by the increase or decrease of the amount of the secondary air supplied to the engine.

Further, in the air intake side secondary air supply system, an open loop control mode is also provided in which the feedback control of the air/fuel ratio is stopped to enrich the air/fuel ratio so as to ensure a stable combustion during a low load operation of the engine such as a decelerating state of the engine. Such an open loop control is also selected during a high load condition, an accelerating state of the engine for example, in order to provide a good driveability.

However, in such a case, a delay of closure of the air control valve generally occurs upon transition from the closed loop mode operation to the open loop mode operation under the low load or the high load condition even if the supply of the first control pressure into the pressure chamber of the air control valve is stopped immediately and the supply of the second control pressure is started subsequently. This is because of a characteristic of the integration operation such that a time period is required in order that the pressure in the pressure chamber reaches the level of the second control pressure to close the air control valve. Therefore the enrichment of the air/fuel ratio is delayed upon transition from the closed loop mode to the open loop mode, to cause an increase of noxious unburned components of the exhaust gas and a deterioration of the driveability.

OBJECTS AND SUMMARY OF THE INVENTION

An object of the present invention is therefore to provide an air intake side secondary air supply system for an internal combustion engine, in which measures are taken to prevent the increase of unburned components in the exhaust gas and the deterioration of the driveability upon transition to the open loop control mode.

According to the present invention, an air intake side secondary air supply system includes first and second secondary air supply passages in which an open/close valve operated in response to an air/fuel ratio detection signal and an air control valve whose opening degree is varied by a magnitude of pressure supplied to its pressure chamber are disposed respectively for proportional and integral control of supply of secondary air. The system is provided with an engine operation detection part for detecting at least a state of engine operation in which a supply of the air intake side secondary air in response to a result of a detection operation of the air/fuel ratio detection device, i.e. the feedback control, is to be stopped, and for generating an engine operation detection signal upon detection of the above state of engine operation; and pressure control part for gradually supplying a first control pressure to the pressure chamber of the air control valve so as to gradually increase the sectional area of a flow through the air control valve when a rich air/fuel ratio detected, and supplying gradually a second control pressure to the pressure chamber of the air control valve so as to gradually decrease the sectional area when a lean air/fuel ratio is detected and the engine operation detection signal is not produced, and rapidly supplying the second control pressure to the pressure chamber of the air control valve so as to rapidly close said air control valve when the engine operation detection signal is produced.

The foregoing and other objects and advantages of the present invention will become more clearly understood upon review of the following description taken in conjunction with the accompanying drawings.

BRIEF DESCRIPTION OF THE DRAWINGS

FIG. 2 is a block diagram showing the construction of the control circuit used in the system of FIG. 1.

DETAILED DESCRIPTION OF A PREFERRED EMBODIMENT

Figure 1:
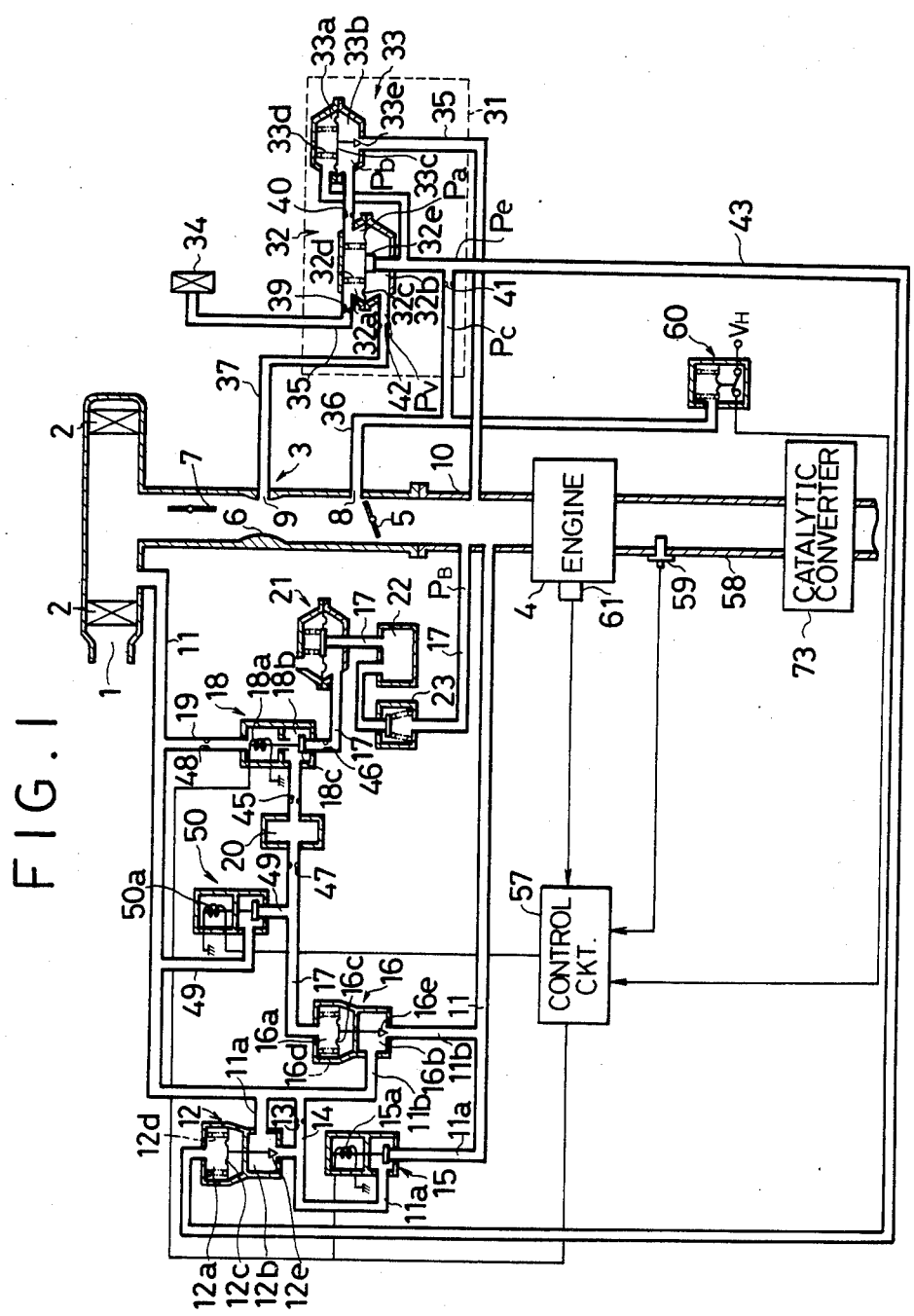
FIG. 1 is a schematic diagram of a preferred embodiment of the air intake side secondary air supply system of the present invention.

FIG. 1 schematically illustrates the preferred embodiment of the air intake side secondary air supply system of the present invention is illustrated. As shown, intake air introduced at an atmospheric air inlet port 1 is supplied to an engine 4 via an air cleaner 2 and a carburetor 3. The carburetor 3 is provided with a throttle valve 5 and a venturi 6 upstream of the throttle valve 5, and a choke valve 7 is provided upstream of the venturi 6. In a throttle body, a vacuum detection hole 8 is provided near the position of the throttle valve 5, in such a manner that it is located upstream of the throttle valve when the throttle valve 5 is closed and downstream of the throttle valve 5 when the throttle valve 5 is open. A vacuum detection hole 9 is also provided in the venturi 6. A portion of the throttle body downstream of the throttle valve 5, i.e. an intake manifold 10, communicates with the air cleaner 2 in the vicinity of an outlet port via an air intake side secondary air supply passage 11. In the middle of the air intake side secondary air supply passage 11, the passage is divided into two air control passages 11a and 11b so that the secondary air is diverted into two streams. A first air control valve 12 is provided in the air control passage 11a. The first air control valve 12 is made up of a vacuum chamber 12a which forms a second pressure chamber and a valve chamber 12b forming a part of the air control passage 11a, a diaphragm 12c forming a part of the vacuum chamber 12a, a valve spring 12d, and a tapered valve element 12e disposed in the valve chamber 12b and urged in a direction to close the air control passage 11a by the valve spring 12d. With this construction, the air control valve 12a varies the sectional area of the air control passage 11a in accordance with the magnitude of the vacuum applied to the vacuum chamber 12a in such a manner that the sectional area increases as the magnitude of the vacuum increases. An air correction passage 14 is provided so as to bypass the first air control valve 12 and an orifice 13 for correcting the idling operation is formed in the air correction passage 14.

Further, a solenoid valve 15 operating as the open/close valve is disposed in the air control passage 11a, downstream of the first air control valve 12. The solenoid valve 15 opens when a solenoid 15a disposed in it is energized.

A vacuum acting in the pressure chamber 12a of the first air control valve 12 is controlled by a vacuum control part 31.

The vacuum control part 31 is made up of a vacuum responsive regulation valve 32 and an air valve 33 which respectively consist of a vacuum chamber 32a or 33a, a valve chamber 32b and 33b, a diaphragm 32c or 33c, a valve spring 32d or 33d, and a valve element 32e or 33e. The vacuum chamber 32a is provided in the middle of a control air passage 35 which starts from an air inlet port 34 having a filter and leads to a part of the intake air passage downstream of the throttle valve 5 and the valve chamber 33b of the air valve 33 is also located in the control air passage 35 downstream of the vacuum chamber 32a. The valve element 33e is urged to close the control air passage 35 by means of the valve spring 33d via the diaphragm 33c. The vacuum chamber 33a communicates with the vacuum detection hole 8 via a vacuum passage 36. The valve chamber 32b communicates with the vacuum detection hole 9 via a vacuum passage 37. The valve chamber 32b communicates with the vacuum passage 36 and the valve element 32e is urged by the valve spring 32d via the diaphragm 32c so as to close the communication from the valve chamber 32b to the vacuum passage 36. In addition, orifices 39, 40 are provided in the control air passage 35, upstream and downstream respectively, of the vacuum chamber 32a. Orifices 41 and 42 are provided respectively in the vacuum passages 36 and 37. A part of the vacuum passage 36 on the side of the valve chamber 32b and the vacuum chamber 33, from the orifice 41 communicates with the vacuum chamber 12a of the first air control valve 12 via the vacuum supply passage 43.

On the other hand, in the air control passage 11b forming the second air intake side secondary air supply passage, there is provided a second air control valve 16 which is constructed in the same manner as the first air control valve 12, and consists of a vacuum chamber 16a, a valve chamber 16b, a diaphragm 16c, a valve spring 16d, and a tapered valve element 16e. The second air control valve 16 controls the sectional area of the air control passage 11b in accordance with the magnitude of the vacuum applied to the vacuum chamber 16a, in a manner that the sectional area increases as the magnitude of the vacuum increases.

The vacuum chamber 16a communicates with the part of the air intake passage downstream of the throttle valve 5 via the vacuum supply passage 17. In the vacuum supply passage 17, there is provided a solenoid valve 18 which is made up of a solenoid 18a, a valve chamber 18b which forms a part of the vacuum supply passage 17, a valve element 18c disposed in the valve chamber 18b and magnetically connected to the solenoid 18a. The valve chamber 18b communicates to the atmosphere via the atmospheric pressure supply passage 19 and closes the vacuum supply passage 17 when deenergized and at the same time a communication between a part of the vacuum supply passage 17 on the vacuum chamber 16a side and the atmospheric pressure supply passage 19 is made through the valve chamber 18b. A surge-tank 20 is provided in the vacuum supply passage 17 on the vacuum chamber 16a side from the solenoid valve 18, and a constant vacuum control valve 21, an storage tank 22, and a non-return valve 23 are provided in this order in the vacuum supply passage 17 on the downstream side of the throttle valve 5 from the solenoid valve 18. The constant vacuum control valve 21 is provided to stabilize the magnitude of the vacuum on the downstream side of the throttle valve 5 to a vacuum Pr which has a predetermined constant level when this magnitude of vacuum becomes greater than the predetermined value, and the non-return valve 23 allows only a flow of the air directed to the downstream portion of the throttle valve 5. In addition, orifices 45, 46 are provided in the vacuum supply passage 17 on both sides of the solenoid valve 18, and an orifice 47 is provided in the vacuum supply passage 17 between the surge tank 20 and the vacuum chamber 16a. An orifice 48 is provided in the atmospheric pressure supply passage 19.

The vacuum supply passage 17 communicates, between the vacuum chamber 16a and the orifice 47, to the atmosphere through an atmospheric pressure supply passage 49. A solenoid valve 50 is provided in the atmospheric pressure supply passage 49 and makes the communication therethrough when a solenoid 50a disposed in it is energized.

The solenoids 15a, 18a, 50a of the solenoid valves are electrically connected to a control circuit 57. The control circuit 57 is supplied with an output signal of an oxygen sensor 59 which is disposed in the exhaust manifold 58 to produce an output voltage VO$_2$ whose level is responsive to the oxygen concentration in the exhaust gas. The output voltage VO$_2$ of the oxygen sensor 59 increases as the oxygen concentration becomes high. In addition to the above elements, a Pc vacuum switch 60, and a rotational speed switch 61 are connected to the control circuit 57.

The Pc vacuum switch 60 is provided to detect the magnitude of the vacuum Pc which is present in the vacuum detection hole 8. The Pc vacuum switch 60 turns on when the magnitude of the vacuum Pc is equal to or lower than a predetermined first pressure $P_1$ (30 mm Hg for instance). The rotational speed switch 61 turns on when the engine rotational speed is equal to or higher than a predetermined rotational speed $N_1$ (900 r.p.m. for example). The Pc vacuum switch 60 and the rotational speed switch 61 respectively produce a high level output signal of a level $V_H$ when turned on, and the high level output signal is supplied to the control circuit 57.

As shown in FIG. 2, the control circuit 57 includes a comparator 64 which compares the output voltage VO$_2$ of the oxygen sensor 59 supplied through a buffer amplifier 63 with a predetermined reference level Vr corresponding to the stoichiometric air/fuel ratio. The control circuit 57 also includes an invertor 65 which receives the output signal of the Pc vacuum switch 60 and an AND gate 66 which gives a logical product between output signals of the comparator 64 and the invertor 65. In the control circuit 57, the output signal of the Pc vacuum switch 60 is also directly supplied to an OR gate 67 to which the output signal of the rotational speed switch 61 is supplied through an invertor 68. A drive circuit 70 for driving the solenoid valves 15 and 18 is connected to an output terminal of the AND gate 66. Similarly, a drive circuit 71 for driving the solenoid valve 50 is connected to an ouput terminal of the OR gate 67.

In the exhaust manifold 58, at a location downstream of the oxygen sensor, there is provided a three-way catalytic converter 73.

The operation of the thus constructed air intake side secondary air supply system according to the present invention will be described hereinafter.

Among the operations of various parts of the system, the operation of the vacuum control part 31 is explained first.

When the Pc vacuum from the vacuum detection hole 8 is applied to the vacuum chamber 33a via the vacuum passage 36 with the operation of the engine 4, the valve element 33e is moved in a direction to open the air valve 33 if the vacuum pressure Pc is greater than the resilient force of the valve spring 33d. When the air valve 33 opens, outside air from the atmospheric air inlet port 34 is introduced to the intake manifold 10 downstream of the throttle valve 5, via the control air passage 35. Levels of a vacuum Pa in the vacuum chamber 32a through which the outside air passes and a vacuum Pb in the valve chamber 33b, are determined in accordance with the aperture ratios of the orifices 39 and 40 respectively.

On the other hand, if the differential pressure between a vacuum Pv from the vacuum detection hole 9 operating in the valve chamber 32b and the vacuum Pa is greater than the resilient force of the valve spring 32d, the valve element 32e is moved in a direction to open the valve 32. When the regulation valve 32 opens, a part of the vacuum Pv is directed to dilute the vacuum Pc past the orifice 41, to produce a vacuum Pe.

Subsequently, due to a reduction of the vacuum Pc consequent on a reduction of the vacuum Pe, the opening degree of the air valve 33 is decreased to reduce the amount of the air flowing through the control air passage 35. By this reduction in the air flow amount, the vacuum Pa in the vacuum chamber 32a is reduced to close the regulation valve 32. As a result, the level of vacuum Pe is raised again and these sequential operations are repeated. It is to be noted that the ratio between the vacuum Pv and the vacuum Pe becomes equal to the ratio between the vacuum Pa and the vacuum Pb, because these operations are repeated very fast.

When the amount of a main intake air of the engine 4 is relatively small, the vacuum Pa is greater than the vacuum Pv. Therefore, the opening degree of the regulation valve 32 becomes large and the vacuum Pe becomes low, as a result. As an increase of the main intake air, the vacuum Pv becomes large. Under such a condition, the opening degree of the regulation valve 32 becomes small and the vacuum Pe in turn becomes high. The vacuum Pe is applied to the vacuum chamber 33a and the vacuum chamber 12a of the first air control valve 12, to open the air control valve 33 and the first air control valve 12. Therefore, the amount of the air flowing through the control air passage 35 becomes proportional to the amount of the secondary air flowing through the air control passage 11a when the solenoid valve 15 is open. Since the amount of the air flowing through the air control passage 35 is proportional to the main intake air of the engine 4, the amount of the above described secondary air becomes proportional to the amount of the main intake air. Therefore, the level of the vacuum Pe becomes proportional to the amount of the main intake air.

In the control circuit 57, if the voltage level VO$_2$ of the oxygen sensor 59 is greater than the predetermined voltage level Vr (VO$_2 \geq$ Vr), this means that the air/fuel ratio is rich. In this condition, the output signal level of the comparator 64 is high. If the voltage level VO$_2$ is lower than the predetermined level Vr (VO$_2 <$ Vr), it means that the air/fuel ratio is lean, and the output signal level of the comparator 64 becomes low.

When the engine is operating under a steady state, in which an opening angle of the throttle valve 5 is greater than a predetermined small value $\theta_1$, the magnitude of the vacuum Pc in the vacuum detection hole 8 becomes greater than the predetermined pressure level $P_1$. In this state, the Pc vacuum switch 60 is turned off and the invertor 65 produces a high level output signal. Therefore, the variation of the output signal level of the AND circuit 66 becomes identical with the variation of the level of the output signal of the comparator 64. When the air/fuel ratio is detected to be rich from the output signal level of the oxygen sensor 59, the output signal level of the AND gate 66 becomes high, and the output signal of the AND gate 66 is in turn supplied to the drive circuit 70 as a "rich signal". Conversely, when the air/fuel ratio is detected to be lean from the output signal level of the oxygen sensor 59, the output signal level of the AND gate 66 becomes low, and the output signal of the AND gate 66 is supplied to the drive circuit 70 as a "lean signal".

In response to the rich signal, the drive circuit 70 energizes the solenoids 15a and 18a, and the solenoid valves 15 and 18 are made operational. On the other hand, solenoids 15a and 18a are deenergized by the drive circuit 70 in response to the rich signal, and the solenoid valves 15 and 18 are made nonoperational In this steady state of the engine operation, when the rotational speed of the engine Ne is equal to or greater than the predetermined rotational speed $N_1$, the rotational speed switch 61 is turned on to provide the high level output signal to the invertor 66. As a result, the level of the output signal of the invertor 66 supplied to the OR gate 67 becomes low. On the other hand, the level of the output signal of the Pc vacuum switch 60 supplied to the OR gate 67 is in the low level. Therefore, a low level signal is supplied from the OR gate 67 to the drive circuit 71, which in turn stops the operation of the solenoid valve 50. The atmospheric pressure supply passage 49 is closed in this state.

When the solenoid valves 15 and 18 are made operational during the closure of the solenoid valve 50, the solenoid valve 15 is immediately opened and the secondary air of an amount corresponding to the opening degree of the first air control valve 12, that is, an amount proportional to the main intake air amount, flows through the air control passage 11a. At the same time, communication through the vacuum supply passage 17 is made by the solenoid valve 18, and the passage to the atmospheric pressure supply passage 19 is closed. Therefore, the vacuum chamber 16a of the second air control valve 16 is supplied with the vacuum Pr. Therefore, the vacuum level in the vacuum chamber 16a gradually approaches to the vacuum Pr by a remaining pressure in the surge tank 20 and the operation of the orifices 45 through 47. As a result, the second air control valve 16 is opened and the secondary air starts to flow through the air control passage 11b. As the vacuum level in the vacuum chamber 16a approaches to the vacuum Pr, the opening degree of the air control valve 16, that is, the sectional area of the air control passage 11b gradually increases so that the amount of the secondary air increases. Therefore, the secondary air respectively flowing through the air control passages 11a and 11b are added together and supplied to the engine 4 via the air intake side secondary air supply passage 11. In this way, the air/fuel ratio of the mixture supplied to the engine is controlled to the lean side and the amount of the secondary air supplied to the engine gradually increases with time.

When, subsequently, the solenoid valves 15 and 18 are made nonoperational while the solenoid valve 50 is closed, the air control passage 11a is immediately closed by the closure of the solenoid valve 15. At the same time, the vacuum supply passage 17 is closed by the solenoid valve 18 in same manner as above, and the communication between a part of the vacuum supply passage 17 on the side of the vacuum chamber 16a and the atmospheric pressure passage 19 is made. Therefore, the the pressure in the vacuum chamber 16a gradually approaches to the atmospheric pressure by means of the residual pressure in the surge tank 20 and the operation of the orifices 48, 45 and 47. As a result, the sectional area of the air control passage 11b is gradually decreased, and the amount of the secondary air is also gradually decreased with time. Thus, the air/fuel ratio of the mixture is controlled towards the rich side.

In the feedback control operation of the air/fuel ratio to the stoichiometric value, the secondary air flows through the air control passage 11a intermittently because the rich signal and the lean signal are generated alternately and continuously. Thus, the amount of the secondary air is controlled by the so called proportional (P) control operation. On the other hand, through the air control passage 11b, the secondary air flows in such a manner that its amount increases upon presence of the rich signal and decreases upon presence of the lean signal. Thus, the so called integration (I) control is performed. Therefore, the total amount of the secondary air flowing through the intake side secondary air passage 11 becomes equal to a summation of the amount of proportional control and the amount of the integral control.

Under a low load operation of the engine in which the opening angle of the throttle valve 5 is smaller than the predetermined opening angle $\theta_1$, the magnitude of the vacuum Pc in the vacuum detection hole 8 becomes smaller than the predetermined pressure level $P_1$. In this state, the Pc vacuum switch 60 is turned on, and the high level output signal is produced by the Pc vacuum switch 60. Accordingly, the invertor 65 produces the low level output signal. In this state, the AND gate 66 provides a low level output signal to the drive circuit 70 irrespectively of the output signal level of the comparator, i.e. the output signal level of the oxygen sensor 59. By the application of the low level signal, the drive circuit 70 stops the operation of the solenoid valves 15 and 18 as in the above described case in which the lean signal is applied. Thus, the solenoid valve 15 is immediately closed to shut the air control passage 11a.

In this state, the high level signal output from the Pc vacuum switch 60 is supplied to the drive circuit 71 through the OR gate 67, so that the solenoid valve 50 is opened by the operation of the drive circuit 71. Thus, communication through the atmospheric pressure supply passage 49 is completed. By the opening of the atmospheric pressure supply passage 49, the atmospheric air is supplied to the vacuum supply passage 17 between the orifice 47 and the vacuum chamber 16a, through the solenoid valve 50 in the atmospheric pressure supply passage 49. Thus, the pressure in the vacuum chamber rapidly becomes equal to the atmospheric pressure. In short, the air control valve 16 is rapidly closed when the solenoid valve 50 opens, to close the air control passage 11b.

Thus, upon transition from the steady state operation to the low load operation of the engine in which the opening angle of the throttle valve 5 is smaller than the predetermined small value, the air control passages 11a and 11b are closed immediately, to stop the feedback control. Thus, the air/fuel ratio is enriched very rapidly.

In a high load state of the engine operation in which, for instance, the throttle valve is fully opened, the Pc vacuum in the vacuum detection hole 8 approaches to the atmospheric pressure. Therefore, the magnitude of the vacuum Pc is lower than the predetermined level $P_1$ in this state, and the Pc vaccum switch 60 is turned on.

Therefore, upon transition from the steady state to the high load state of the engine operation, the air control passages 11a and 11b are closed immediately as in the above described case of the transition to the low load operation. Thus, the air/fuel ratio of the mixture supplied to the engine is very rapidly enriched.

Further, in a low speed range of the engine operation in which the rotational speed of the engine Ne is lower than the predetermined rotational speed $N_1$, the rotational speed switch 61 is turned off and the high level output signal is produced by the invertor 66. This high level output signal of the invertor 66 is supplied to the driver 71 through the OR gate 67, so that the solenoid valve 50 is operated to make communication through the atmospheric pressure supply passage 49. Accordingly, the atmospheric pressure is supplied to the vacuum chamber 16a to close the air control valve 18 irrespectively of the operating state of the solenoid valve 18. The integral control is stopped in this way, and the air intake side secondary air is intermittently supplied to the intake manifold 10 only through the solenoid valve 15 which opens and closes alternately. By effecting only the proportional control in the low speed operation range as explained above, a hunting of the air/fuel ratio having a large magnitude is prevented.

It will be appreciated from the above, in the air intake side secondary air supply system according to the present invention, the low load state and the high load state of the engine operation are detected only by means of the Pc vaccum switch 60. Thus, there are advantages that the construction of the system is very much simplified and a sufficient cost reduction is enabled.

In addition, with the air intake side secondary air supply system according to the present invention, the air control valve is closed rapidly to shut the air intake side secondary air supply passage at the time of the transition into the operational state of the engine in which the air/fuel ratio feedback control is to be stopped, such as in the low load state or the high load state of the engine operation. In other words, the integral control operation for gradually increasing or decreasing the amount of the air intake side secondary air in accordance with a result of detection of the air/fuel ratio, which is performed by the air control valve, is stopped. Thus, the time delay caused by the integral control is avoided so that the air/fuel ratio is enriched immediately upon transition to the control operation in which the air/fuel ratio feedback control is to be stopped. In this way, the increase of the noxious unburned components in the exhaust gas and the deterioration of the driveability are prevented. More concretely, the supply of an over lean mixture upon transition to the low load state of the engine operation is prevented. Also, upon transition into the high load state of the engine operation, the driveability of the engine is improved by an immediate supply of an enriched mixture.

Moreover, it is to be noted that according to the present invention the air/fuel ratio is controlled very precisely towards the stoichiometric value during the feedback control operation. This is enabled by the construction that the proportional control of the secondary air is performed by the open/close valve in the first air intake side secondary air supply passage, and the integral control of the secondary air is performed by the air control valve in the second air intake side secondary air supply passage.

What is claimed is:

1. An air intake side secondary air supply system for an internal combustion engine having an intake air passage with a carburetor and a throttle valve, comprising:

a first secondary air supply passage leading to the intake air passage downstream of the throttle valve;

a second secondary air supply passage leading to the intake air passage downstream of the throttle valve;

air/fuel ratio detection means for detecting an air/fuel ratio of a mixture supplied to the engine from a composition of an exhaust gas of the engine;

an open/close valve disposed in said first secondary air supply passage which is operated to open only when said detection means detect a rich air/fuel ratio;

an air control valve having a pressure chamber and disposed in said second secondary air supply passage, for varying a sectional area of a flow through said second secondary air supply passage in response to a magnitude of a pressure applied in said pressure chamber;

a first control pressure source for generating a first control pressure for opening said air control valve;

a second control pressure source for generating a second control pressure for closing said air control valve;

engine operation detection means for detecting at least a state of engine operation in which a supply of said air intake side secondary air in response to a result of a detection operation of said air/fuel ratio detection means is to be stopped, and for generating an engine operation detection signal upon detection of said state of engine operation; and pressure control means for gradually supplying said first control pressure to said pressure chamber so as to gradually increase said sectional area when said air/fuel ratio detection means detect the rich air/fuel ratio, and supplying gradually said second control pressure to said pressure chamber so as to gradually decrease said sectional area when said air/fuel ratio detection means detect a lean air/fuel ratio and said engine operation detection signal is not produced, and rapidly supplying said second control pressure to said pressure chamber so as to rapidly close said air control valve when said engine operation detection signal is produced by said engine operation detection means.

2. A system as set forth in claim 1, wherein said engine operation detection means detect a low load state of engine operation and a high load state of engine operation as said at least a state of engine operation.

3. A system as set forth in claim 1, wherein said engine operation detection means generate said engine operation detection signal when a magnitude of vaccum in a vaccum detection hole formed in said intake air passage near to said throttle valve is lower than a predetermined pressure level.

4. A system as set forth in claim 3, wherein said engine operation detection means comprises a vacuum switch disposed in said intake air passage near to a position of said throttle valve which generates a high level output signal when a magnitude of vaccum in a vacuum detection hole is lower than a predetermined pressure level, a rotational speed switch for detecting a rotational speed of the engine which generates a high level output signal when the rotational speed of the engine is equal to or higher than a predetermined rotational speed level, an invertor connected to said rotational speed switch, an OR gate connected to output terminals of said vacuum switch and said invertor, and a drive circuit connected to said OR gate, for driving said solenoid valve when a high level signal is supplied from said OR gate.

5. A system as set forth in claim 1, wherein said pressure control means comprises a three way solenoid valve connected to said pressure chamber via pressure supply passage and said first and second control pressure sources, an orifice provided in said pressure supply passage for regulating transmissions of said first and second control pressures, and a solenoid valve connected to said second control pressure source and to said pressure supply passage between said air control valve and said orifice, operated in response to said engine operation detection signal to supply said second control pressure rapidly when said engine operation detection signal is produced.

* * * * *